United States Patent [19]

Hoover

[11] Patent Number: 4,647,463
[45] Date of Patent: Mar. 3, 1987

[54] ROASTED HONEY COATED NUT PRODUCT AND METHOD FOR MAKING SAME

[76] Inventor: Maurice W. Hoover, 920 Merwin Rd., Raleigh, N.C. 27606

[21] Appl. No.: 644,349

[22] Filed: Aug. 27, 1984

Related U.S. Application Data

[63] Continuation-in-part of Ser. No. 481,779, Apr. 4, 1983, abandoned.

[51] Int. Cl.4 .................................................. A23L 1/36
[52] U.S. Cl. .................................... 426/291; 426/293; 426/295; 426/303; 426/307; 426/632
[58] Field of Search ................... 426/93, 98, 103, 293, 426/295, 291, 303, 305, 307, 309, 541, 466, 632, 629

[56] References Cited

U.S. PATENT DOCUMENTS

| | | | |
|---|---|---|---|
| 3,063,843 | 11/1962 | Hashimoto | 426/93 |
| 3,184,316 | 5/1965 | Doan et al. | 426/303 |
| 3,740,236 | 6/1973 | Baxley | 426/293 |
| 4,053,650 | 10/1977 | Chino et al. | 426/309 |
| 4,161,545 | 7/1979 | Green et al. | 426/632 |

OTHER PUBLICATIONS

Clay, Peanuts & Peanut Products, USPA Marketing Service, 10/29/41.

*Primary Examiner*—Raymond N. Jones
*Assistant Examiner*—Marianne M. Cintins
*Attorney, Agent, or Firm*—Mills & Coats

[57] ABSTRACT

This invention is a roasted nut product that is subsequently coated with an aqueous solution containing sucrose, honey, corn syrup, vegetable oil, emulsifiers and certain other ingredients.

25 Claims, No Drawings

ROASTED HONEY COATED NUT PRODUCT AND METHOD FOR MAKING SAME

The present application is a continuation-in-part of U.S. Patent application Ser. No. 481,779, filed Apr. 4, 1983, now abandoned for "ROASTED HONEY COATED NUT PRODUCT AND METHOD FOR MAKING SAME".

FIELD OF INVENTION

This invention relates to food products and more particularly to coated nut products.

BACKGROUND OF INVENTION

The process of coating nut products with various ingredients is well known. For example, U.S. Pat. No. 4,053,650 by Chino et al discloses a process whereby nuts are coated with an aqueous gum solution containing sugar and then baked. U.S. Pat. No. 3,671,266 by Cooper et al describes a process for producing a sorbitol coated nut product that comprises coating raw nuts with an aqueous sorbitol solution followed by roasting the nuts and cooling. U.S. Pat. No. 3,063,843 to Hashimoto discloses a process for coating raw nuts with a sugar syrup, roasting the nuts and then coating them with a sauce containing soy sauce, salt, sugar and water. Green et al in U.S. Pat. No. 4,161,545 describes a process whereby raw nuts are coated with a honey solution, then enrobed with sugar and starch and thereafter roasting the nuts.

There are several problems inherent in any process where the nuts are coated before roasting with honey or sugar such as mentioned above. When any sugar, particularly reducing sugar, is added to nuts before roasting, there is an enormous problem in maintaining good color and flavor during the roasting process. Experience has taught that it is almost impossible to produce a nut product with good color when the sugar-honey solution is added prior to dry roasting. The excessive caramelization that occurs when reducing sugars are added to the nuts prior to hot air roasting is of such an adverse mangitude and extent as to discourage coating the raw nuts with sugar and honey before roasting. This discoloration problem is not nearly as acute when the nuts are oil roasted compared to when they are air roasted.

BRIEF DESCRIPTION OF INVENTION

After much research and study into the above-mentioned problems, the present invention has been developed to produce a superior nut product with a honey-sugar or sugar syrup coating that is thin, nonsticky, and forms a smooth even film. This is accomplished through a unique process which prevents discoloration and is not susceptible to moisture pick-up in humid conditions.

In view of the above, it is an object of the present invention to produce a superior nut product by coating roasted nuts with a honey-sugar or sugar syrup coating in such a manner that a thin, non-sticky film coating covers the nuts smoothly and evenly.

Another object is to provide a superior honey-coated nut product with a thin non-sticky coating which is not susceptible to moisture pick-up even under humid conditions.

Another object is to provide a coated nut product having an improved color and flavor that is not possible by the use of other coating and roasting techniques.

Another object is to provide a honey and/or sugar-coated nut product with a smooth translucent appearance that has a longer than normal storage life.

Other objects and advantages of the present invention will become apparent from a study of the following description.

DETAILED DESCRIPTION OF INVENTION

Nuts which may be treated in accordance with the practice of this invention include peanuts, cashews, almonds, pecans and other edible nuts from which the shells have been removed. The nuts may be first blanched to remove the skins or used with the skins on.

This invention comprehends the coating of previously roasted nuts with a hot emulsified liquid coating which consist of sucrose, honey, vegetable oil, water, emulsifiers such as monodiglyceride and/or lecithin, antioxidants and flavors may also be included in the coating. Corn syrup may be substituted for any portion of the honey, but it should not exceed about 20% of the coating solution.

It is important to the successful coating of the nuts that they be at a temperature above about 160° F. but less than about 350° F., when the coating is applied. The coating material should be fluid enough to properly coat the hot nuts which normally requires a coating solution temperature of at least 160° F. Experimentation has demonstrated that the moisture content of the coating solution should not exceed about 30% to obtain the best results. The final moisture content of the coated product should not exceed about 5%.

In the preferred embodiment of this invention, the hot freshly roasted nuts are fed directly to the coating apparatus from the roaster. The roasted nuts may be partially cooled to above about 160° F. prior to applying the hot liquid coat providing the coated nuts are subsequently subjected to another drying sequence. Normally the heat of the nuts and solution is sufficient to dry off any excess moisture. After the nuts are roasted and conveyed into the revolving coating drum, a hot emulsified coating solution is dribbled or sprayed on to the roasted nuts at the rate of 5 to 20%, based on the weight of the nuts. The solution generally contains from 40 to 60% sugar, up to 30% honey or a blend of honey and corn syrup in the same usage range, up to 30% corn syrup, 10 to 30% vegetable oil, 5 to 30% water, up to 5% mono-diglycerides and up to 5% lecithin. A blend of glycerides and lecithin may be used in the range of 2 to 7% of the solution. Various other minor ingredients may be added to the solution such as butter, butter flavor, nut flavors, spices and the like. Coloring materials such as caramel and annatto may also be added to the coating solution if desired. An emulsion of the various ingredients in the coating solution is prepared by vigorously agitating the solution while heating to at least 180° F.

The roasted nuts are coated with the sugar-honey solution in a revolving coating pan or drum. It is preferred that the nuts move through the system in a continuous manner rather than with a batch system. More than one coating may be applied providing the nuts are heat treated between coatings to dry off the excess moisture. A dusting powder in an amount ranging from about 0.5 to 5% based on the weight of the nuts may be added to cause the coated nuts to separate and roll freely without sticking. A suitable dusting powder is made up preferably of 50 to 100% confectionary or powdered sugar, dextrose or corn syrup solids, up to 30% salt and up to 40% starch. Salt alone may be used depending upon the amount of oil used in the coating solution. The higher the oil concentration in the coating solution, the less dusting powder is needed and may be eliminated altogether.

After the nuts are coated with the coating solution and are rolling freely, an additional amount of oil for glossing or dressing the product may be sprayed or dribbled onto the tumbling coated nuts at the rate of about 1 to 5%, based on the weight of the nuts. The dressing oil may consist of 90 to 100% vegetable oil, up to 5% lecithin and up to 10% mono-diglycerides. The dressing oil gives a glossy sheen to the coating nuts and under certain circumstances increases the shelf life, particularly if antioxidants such as Tertiary Butylhydroquinone (TBHQ), Butylated Hydroxyanisole (BHA), or Butylated Hydroxytaluene (BHT) are included in the dressing oil.

As an example of this invention, 1000 grams of peanuts were air roasted at a temperature of 325° F. for 20 minutes. Then the hot roasted nuts were placed in a revolving coating pan. One hundred grams of a hot solution containing 54% sucrose, 20% honey, 14% vegetable oil, 10% water, 1% mono-digylcerieds and 1% lecithin was added to the hot tumbling nuts. Then 30 grams of a dusting powder containing 76% powdered sugar, 20% salt and 4% starch was added to cause the nuts to separate and tumble freely. Then 50 grams of a hot dressing oil were added to the tumbling nuts to give a gloss or sheen to the finished product. The cooled and coated nuts were then packaged.

As another example of this invention, 1000 grams of peanuts were air roasted at 350° F. for 17 minutes. The hot roasted nuts were placed in a rotating coating pan. One-hundred and twenty grams of a hot solution containing 46% sucrose, 10% honey, 10% high fructose corn syrup, 20% vegetable oil, 10% water, 2% mono-diglycerides and 2% lecithin were added to the hot tumbling nuts. Then 40 grams of a dusting powder containing 80% dextrose and 20% salt were added to the coated nuts. The nuts were then cooled and packaged.

As another example of this invention, 1000 grams of peanuts were roasted for 20 minutes at 325° F. and placed immediately into a revolving coating pan. Then 130 grams of a hot emulsified solution containing 44% sucrose, 16% honey, 27% vegetable oil, 9% water and 4% lecithin were dribbled over the tumbling nuts. The tumbling was allowed to continue until a smooth coat was formed after which the nuts were cooled and packaged.

Experimentation has shown that the storage life of nuts produced in accordance with this invention can be extended by the use of antioxidants in either the sugar-honey coating solution or the dressing oil. Either TBHQ, BHA, BHT or a combination of any of these may be used. The level of active antioxidant usage should not exceed about 0.02% of the total oil content of the finished product. Since these antioxidants are generally oil soluble, they should normally be dissolved in the oil fraction of the coatings before applying to the nuts.

Although dry roasting is the preferred method of roasting the nuts prior to applying the coatings according to this invention, oil roasted nuts may also be used and coated successfully when circumstances make this method of roasting more convenient and available.

From the above it can be seen that the present invention has the advantage of extending the storage life of the processed nuts while at the same time giving them a superior coating which is not susceptible to moisture pick-up and stickiness. The process is relatively simply and yet highly efficient while at the same time improving both the color and flavor of the nut product.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A process for coating nuts with a candy coating solution comprising: shelling said nuts; roasting said nuts at a temperature; such that during the subsequent coating step the temperature of said nuts remains between approximately 160 to 350 degrees Fahrenheit; tumbling said nuts in a rotating coating apparatus; preparing a hot, emulsified coating solution containing 40 to 60% sugar, up to 30% corn syrup, up to 30% honey, 10 to 30% vegetable oil, 5 to 30% water and 1 to 7% emulsifiers; applying said hot, emulsified coating solution directly to said roasted nuts at a rate of 5 to 20% by weight of said nuts while continuing to tumble the same and while the temperature of said nuts remains between approximately 160 to 350 degrees Fahrenheit so that the excess moisture in the coating solution is evaporated by the residual heat of the roasted nuts and coating solution; applying a dusting powder to the coated nuts while continuing to tumble the same whereby said nuts will separate and tumble freely; adding a dressing oil to said coated, dusted nuts to give a translucent sheen or glow thereto; removing said nuts from said rotating coating apparatus; and cooling and packaging said nuts.

2. The process of claim 1 wherein the emulsifier in the coating solution is a mono and diglyceride ranging up to 5%.

3. The process of claim 1 wherein the emulsifier in the coating solution is lecithin and ranges up to 5%.

4. A process of claim 1 wherein the emulsifier in the coating solution is a blend of mono-diglycerides and lecithin ranging between 1 and 7%.

5. The process of claim 1 wherein a dusting powder containing 50 to 100% confectionary sugar is applied to the nuts at the rate of 1 to 5%, based on the weight of nuts.

6. The process of claim 1 wherein a dusting powder containing 50 to 100% dextrose is applied to the nuts at the rate of 1 to 5%, based on weight of nuts.

7. The process of claim 1 wherein a dusting powder containing 50 to 100% corn syrup solids is applied to the nuts at the rate of 1 to 5%, based on weight of nuts.

8. The process of claim 1 wherein a dusting powder containing a blend of confectionary sugar, dextrose and corn syrup solids is applied to the nuts at the rate of 1 to 5%, based on weight of nuts.

9. The process of claim 1 wherein said dressing oil contains from 90 to 100% vegetable oil and is applied after said emulsified coating solution at the rate of 2 to 10%, based on weight of nuts to give a translucent sheen or gloss to the surface of the finised product.

10. The process of claim 1 wherein a dusting powder containing a blend of two ingredients selected from the group consisting of confectionary sugar, dextrose and corn syrup is applied to the nuts at a rate of 1 to 5%, based on weight of nuts.

11. A process for coating nuts with a candy coating solution comprising: shelling said nuts; roasting said nuts at a temperature greater than 160 degrees Fahrenheit; tumbling said nuts in a rotating coating apparatus; preparing a hot, emulsified coating solution including vegetable oil, water, emulsifiers and ingredients selected from the group consisting of sugar, honey and corn syrup, said water comprising not more than 30% of said emulsified solution; applying said hot, emulsified coating solution directly to said roasted nuts while continuing to tumble the same and while the temperature of said nuts remains at least 160 degrees Fahrenheit so that the excess moisture in the coating solution is evaporated by the residual heat of the roasted nuts and coating solution; applying a dusting powder to said nuts while continuing to tumble the same whereby said nuts will separate and tumble freely; removing said nuts from said coating apparatus; cooling said nuts; and packaging said nuts.

12. The process of claim 11 wherein said coating solution comprises approximately 40 to 60% sugar.

13. The process of claim 11 wherein said coating solution includes no more than 30% honey.

14. The process of claim 11 wherein said roasting solution includes no more than 30% corn syrup.

15. The process of claim 11 wherein said coating includes no more than 30% vegetable oil.

16. The process of claim 11 wherein said emulsifier is a mono-diglyceride and comprises up to 5% of said coating solution.

17. The process of claim 11 wherein said emulsifier is a lecithin and comprises up to 5% of said coating solution.

18. The process of claim 11 wherein said emulsifier is a blend of glycerides and lecithin and comprises approximately 2 to 7% of said coating solution.

19. The process of claim 11 wherein said coating solution comprises 50 to 100% confectionary sugar, up to 30% salt and up to 40% starch.

20. The process of claim 11 including adding a dressing oil to said roasted dusted nut at a rate of 1 to 5% by weight of said nuts, to give the same a glossy sheen.

21. The process of claim 20 wherein said dressing oil comprises approximately 90 to 100% vegetable oil, up to 5% lecithin and up to 10% mono-diglycerides.

22. The process of claim 11 wherein the temperature of said coating solution is at least 160 degrees Fahrenheit when applied to said nuts.

23. A process for coating nuts with a candy coating solution comprising: shelling said nuts; roasting said nuts at a temperature such that during the subsequent coating step the temperature of said nuts remains between approximately 160 to 350 degrees Fahrenheit; tumbling said nuts in a rotating coating apparatus; preparing a hot, emulsified coating solution including sugar, honey, vegetable oil, water and emulsifiers, said water comprising not more than 30% of said emulsified coating solution; applying said hot, emulsified coating solution to said roasted nuts while continuing to tumble the same, and while the temperature of said nuts remains between approximately 160 to 350 degrees Fahrenheit so that the excess moisture in the emulsified coating solution is evaporated by the residual heat in said nuts and coating solution; applying a dusting powder to said coated nuts while continuing to tumble the same whereby said nuts will separate and tumble freely; removing said nuts from said coating apparatus; cooling said nuts; and packaging said nuts.

24. The process of claim 23 further including adding a dressing oil to said nuts after said dusting powder has been applied to give a translucent sheen or gloss thereto.

25. The process of claim 23 wherein the temperature of said coating solution is at least 160 degrees Fahrenheit.

* * * * *